United States Patent
Marchal et al.

(10) Patent No.: US 10,364,982 B2
(45) Date of Patent: Jul. 30, 2019

(54) METHOD FOR RECONDITIONING FUEL NOZZLE ASSEMBLIES

(71) Applicant: Ansaldo Energia Switzerland AG, Baden (CH)

(72) Inventors: Darius N. Marchal, Jupiter, FL (US); Michael McGhee, Lake Worth, FL (US)

(73) Assignee: ANSALDO ENERGIA SWITZERLAND AG (CH)

( * ) Notice: Subject to any disclaimer, the term of this patent is extended or adjusted under 35 U.S.C. 154(b) by 302 days.

(21) Appl. No.: 15/354,030

(22) Filed: Nov. 17, 2016

(65) Prior Publication Data

US 2017/0146235 A1 May 25, 2017

Related U.S. Application Data

(60) Provisional application No. 62/257,575, filed on Nov. 19, 2015.

(51) Int. Cl.
*F23D 11/38* (2006.01)
*B23P 6/00* (2006.01)
(Continued)

(52) U.S. Cl.
CPC ............. *F23D 11/38* (2013.01); *B23P 6/002* (2013.01); *B23P 6/005* (2013.01); *B23P 15/008* (2013.01);
(Continued)

(58) Field of Classification Search
CPC .. B23P 6/002; B23P 6/005; B23P 6/00; B23P 15/008; B23P 19/04; B23P 2700/13; B23K 1/0056; B05B 1/00; B05B 3/00; F23D 11/38; F05D 2230/80; F23R 3/343; F23R 3/283; F23R 3/14; F23R 3/286; F23R 2900/00016; Y10T 29/49718; Y10T 29/49721; Y10T 29/49723; Y10T 29/49725; Y10T 29/49726; Y10T 29/49728; Y10T 29/49432; Y10T 29/49434; Y10T 29/49437; Y10T 29/49742; Y10T 29/49323; Y10T 29/49433
See application file for complete search history.

(56) References Cited

U.S. PATENT DOCUMENTS 5,361,578 A * 11/1994 Donlan ............... F02C 3/30
60/39.55
5,685,139 A * 11/1997 Mick .................. F23D 14/02
239/428

(Continued)

*Primary Examiner* — Sarang Afzali
(74) *Attorney, Agent, or Firm* — Hovey Williams LLP

(57) ABSTRACT

A method of reconditioning and fabricating turbine components is provided. In one embodiment, the method is performed on a fuel nozzle assembly of a gas turbine, and comprises providing a pre-assembled fuel nozzle assembly having a base, a body extending from the base to a fuel nozzle tip, an inner assembly, and an outer assembly. The method further comprises removing at least a portion of the fuel nozzle tip and the inner assembly, coupling and joining a replacement inner assembly to the base, and coupling and joining a replacement fuel nozzle tip to the replacement inner assembly and to the outer assembly to provide a reconditioned fuel nozzle.

7 Claims, 17 Drawing Sheets

(51) Int. Cl.
  *B23P 15/00*   (2006.01)
  *F23R 3/28*    (2006.01)
  *F23R 3/34*    (2006.01)
  *B23K 1/005*   (2006.01)

(52) U.S. Cl.
  CPC .............. *F23R 3/283* (2013.01); *F23R 3/286* (2013.01); *F23R 3/343* (2013.01); *B23K 1/0056* (2013.01); *B23P 2700/13* (2013.01); *F23R 2900/00016* (2013.01)

(56) References Cited

U.S. PATENT DOCUMENTS

| | | | | |
|---|---|---|---|---|
| 7,908,863 | B2* | 3/2011 | Hessler | F23D 11/24 60/737 |
| 8,752,389 | B2* | 6/2014 | Myers | F23D 14/46 60/742 |
| 8,904,635 | B2* | 12/2014 | Berkebile | B23K 1/0056 29/889.1 |
| 9,187,816 | B2* | 11/2015 | Pope | C23C 10/18 |
| 9,259,807 | B2* | 2/2016 | Means | B23P 6/002 |
| 2017/0080530 | A1* | 3/2017 | McGhee | B23P 6/005 |

* cited by examiner

METHOD FOR RECONDITIONING FUEL NOZZLE ASSEMBLIES

CROSS-REFERENCE TO RELATED APPLICATIONS

This application claims the priority benefit of U.S. Provisional Patent Application Ser. No. 62/257,575, filed Nov. 19, 2015, entitled "Welded Fuel Nozzle and Method of Fabricating a Fuel Nozzle," incorporated by reference in its entirety herein.

TECHNICAL FIELD

The field of the invention relates to manufacturing, fabricating, and reconditioning of gas turbine components.

BACKGROUND OF THE INVENTION

Gas turbines include numerous components such as, for example, a combustor for mixing air and fuel for ignition, a turbine blade and rotor assembly for producing power, and a fuel nozzle assembly for providing fuel to the combustor for operation of the gas turbine. Some gas turbine components, such as fuel nozzle assemblies, are positioned near the combustor and are exposed to high temperatures for extended periods of time. As a result, durability limits of these components can be reached or exceeded, requiring reconditioning (i.e., repair, refurbishing, and/or at least partial replacement) of the components or manufacturing of new-make components to allow continued operation of the gas turbine.

Reconditioning of gas turbine components is often challenging, due to the difficulty of removing and replacing materials, the difficulty of reusing components, and/or the difficulties caused by reduced integrity of structures after reconditioning is performed, among other reasons. As a result, a new and improved method of reconditioning turbine components that addresses these issues, among others, is needed.

SUMMARY

This summary presents a high-level overview of various aspects of the present invention and a selection of concepts that are further described below in the detailed description section of this disclosure. This summary is not intended to identify key or essential features of the claimed subject matter, nor is it intended to be used as an aid in isolation to determine the scope of the claimed subject matter. The scope of the invention is defined by the claims.

In brief, and at a high level, this disclosure describes, among other things, a method for reconditioning turbine components. In one embodiment, the method is used to recondition a pre-assembled fuel nozzle assembly used in a gas turbine. The method includes removing one or more components, or portions thereof, from the assembly that are damaged or otherwise need to be reconditioned, fabricating or providing replacement components, and installing the replacement components to provide a reconditioned fuel nozzle assembly. Different removal and joining methods may be utilized to make repeated reconditioning of the assembly and other components possible, due in part to minimal sacrifice or extraction of material from the assembly or other components, and unique assembly methods, a number of which are described in detail in this disclosure.

In a first embodiment, a fuel nozzle assembly is provided. The assembly comprises a base, a body extending from the base to a fuel nozzle tip, the body comprising an inner channel defined at least partially by an inner channel wall and an outer channel defined at least partially by an outer channel wall, and the fuel nozzle tip. The fuel nozzle tip is welded to the inner channel wall, and the inner channel wall is welded to the base.

In a second embodiment, a method for producing fuel nozzle assemblies is provided. The method comprises providing a fuel nozzle assembly comprising a base, and a body extending from the base to a fuel nozzle tip, the body comprising an inner channel defined at least partially by an inner channel wall and an outer channel defined at least partially by an outer channel wall, the inner channel wall and the outer channel wall each brazed to the base. The fuel nozzle tip comprises an end cover that is brazed to the inner channel wall and coupled to the outer channel wall. The method further comprises decoupling at least a portion of the fuel nozzle tip from the inner channel wall and the outer channel wall, decoupling at least a portion of the inner channel wall from the base, removing the decoupled portion of the inner channel wall from the body, providing a replacement inner channel wall that is welded to a replacement fuel nozzle tip, welding the replacement inner channel wall to the base, and coupling the replacement fuel nozzle tip to the outer channel wall.

In a third embodiment, a method for producing fuel nozzle assemblies is provided. The method comprises providing a fuel nozzle assembly comprising a base, and a body extending from the base to a fuel nozzle tip. The body comprises an inner assembly and an outer assembly, with each of the inner assembly and the outer assembly coupled to the base and to the fuel nozzle tip. The method further comprises decoupling the fuel nozzle tip or a portion thereof from the body, decoupling the inner assembly or a portion thereof from the base, removing the decoupled inner assembly or the portion thereof from the body, welding a replacement inner assembly to the base. The replacement inner assembly is welded to a replacement fuel nozzle tip. The method further comprises coupling the replacement fuel nozzle tip to the outer assembly.

In a fourth embodiment, a method for assembling a fuel nozzle assembly is provided. The method comprises providing a base, and providing a body extending from the base to a fuel nozzle tip, the body comprising an inner channel defined at least partially by an inner channel wall and an outer channel defined at least partially by an outer channel wall. The fuel nozzle tip comprises an end cover that is welded to the inner channel wall. The method further comprises welding the inner channel wall to the base, welding the outer channel wall to the base, and coupling the fuel nozzle tip to the outer channel wall.

Although the methods, assemblies, and systems described in this disclosure are described in the context of gas turbine components, assemblies, and systems, the methods described herein may be used for reconditioning any component or structure. Similarly, the methods, assemblies, and systems described in this disclosure may be referenced in the context of fuel nozzle assemblies, but the methods, assemblies, and systems may further be utilized for reconditioning other gas turbine components, as well.

Inner assembly, as used in this disclosure, may comprise at least an inner channel wall of a fuel nozzle assembly, as well as other associated or coupled components. Outer assembly, as used in this disclosure, may comprise at least an outer channel wall, as well as other associated or coupled components. Each of the inner and outer assemblies may be distinct, or may comprise one or more common components, surfaces, features, and/or couplings, and as such, there may not be clear delineations between the inner and outer assemblies included in this disclosure.

BRIEF DESCRIPTION OF THE SEVERAL VIEWS OF THE DRAWINGS

Illustrative embodiments of the present invention are described in detail below with reference to the attached drawing figures, which are incorporated herein, wherein.

DETAILED DESCRIPTION

Figure 1:
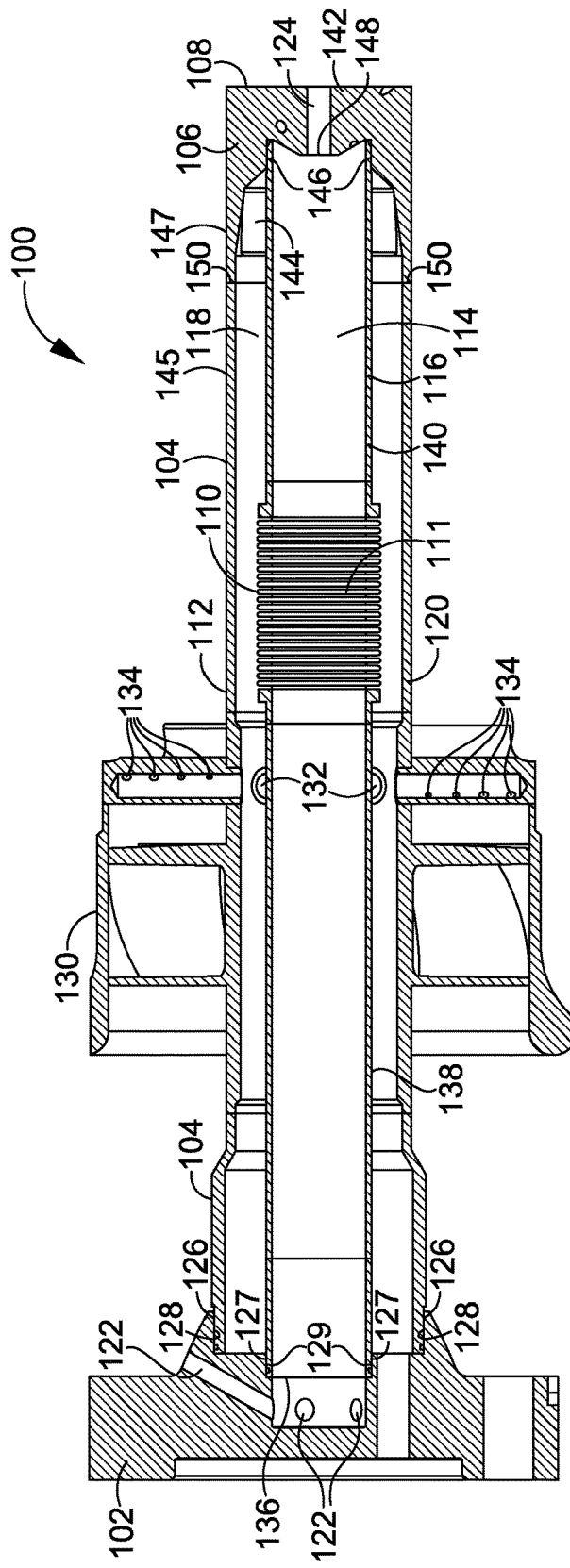
FIG. 1 is a cross-sectional view of an exemplary pre-assembled center fuel nozzle assembly for a gas turbine, in accordance with an embodiment of the present invention.

The subject matter of the various embodiments of the present invention is described with specificity in this disclosure to meet statutory requirements. However, the description is not intended to limit the scope of invention. Rather, the claimed subject matter may be embodied in various other ways to include different features, components, elements, combinations, and steps, similar to the ones described in this document, and in conjunction with other present and future technologies. Terms should not be interpreted as implying any particular order among or between various steps unless the order of the steps is explicitly required. Many different arrangements of the various components depicted, as well as use of components not shown, are possible without departing from the scope of the claims.

At a high level, the present invention generally relates to methods for reconditioning existing turbine components and manufacturing new turbine components, such as, for example, a fuel nozzle assembly in a gas turbine. An exemplary method may include providing a pre-assembled fuel nozzle assembly that includes a base, a body extending from the base to a fuel nozzle tip, an inner assembly which includes an inner channel wall, and an outer assembly which includes an outer channel wall. Further, the inner and outer assemblies may each be coupled, or affixed, by any number of joining methods such as, for example, beam welding, solid state welding, or some combination thereof, in addition to other possible joining methods.

The reconditioning process may involve removing at least a portion of the fuel nozzle tip from the body, removing at least a portion of the inner assembly from the base, and replacing at least a portion of the inner assembly with a replacement inner assembly, which may be joined to the base and may also be joined to a replacement fuel nozzle tip. The replacement fuel nozzle tip may be joined to the outer assembly. As a result, a reconditioned fuel nozzle assembly may be provided that reuses at least a portion of the original assembly components and that can be assembled with limited alteration or reduction in structural integrity of the pre-existing assembly. Additionally, new-make manufacturing may involve assembling similar components as those described in the reconditioning processes, in original form, through methods that utilizing beam welding.

Traditional fuel nozzle construction often utilizes ductile braze materials capable of operating in high temperature environments. To achieve necessary ductility design requirements for fuel nozzles, this braze material is often comprised of costly precious metals, such as gold, palladium, and/or platinum, for example. Reconditioning of brazed fuel nozzles may require fuel nozzle disassembly down to component constituents, including diffusion zone removal within the base metal about each braze joint. This material removal limits the number of reconditioning cycles, in certain situations, to as little as approximately three repairs. The complex geometry of the fuel nozzle assembly and inherent difficulty in reaching specific affixation junctures often makes techniques other than brazing difficult to use. As a result, a fuel nozzle reconditioning and manufacturing/fabrication process, such as those described herein, which addresses these issues, is desirable.

Having described some general aspects of the invention, reference is now made to FIG. 1, which depicts a cross-sectional view of an exemplary pre-assembled center fuel nozzle assembly 100 for a gas turbine, in accordance with an embodiment of the present invention. In FIG. 1, the assembly 100 includes a base 102, a body 104 extending from the base 102, and a fuel nozzle tip 106 coupled to the body 104 at a distal end 108 of the body 104 opposite the base 102. Further, the assembly 100 includes an inner assembly 110 and an outer assembly 112. The inner assembly 110 includes an inner channel 114 that is at least partially defined by an inner channel wall 116, which extends at least part of the way through the body 104. The outer assembly 112 includes an outer channel 118 that is at least partially defined by the inner channel wall 116 and an outer channel wall 120. The outer channel 118 is generally the space between the inner channel wall 116 and the outer channel wall 120. The assembly 100 may be configured such that there is no fluid communication between the inner channel 114 and the outer channel 118, Only the outer channel 118 may be supplied with fuel through a fuel connection, in order to supply the fuel to the combustor.

The inner channel 114 includes a plurality of inner channel openings 122 at or near the base 102 that provide fluid communication with the inner channel 114. In this respect, the plurality of inner channel openings 122 may be used to provide cooling fluid or gas (e.g., air) to the inner channel 114 to cool the assembly 100. Furthermore, in FIG. 1, the inner channel 114 is in fluid communication with an outside environment through an opening 124 in the fuel nozzle tip 106, to allow the fluid or gas to evacuate the inner channel 114 through the opening 124. The body 104 is welded or otherwise joined to the base 102 at base edges 126 and 127 of the body 104 and base edges 128 and 129 of the base 102 (also shown in FIG. 6). Additionally, a swirler assembly 130 is coupled to the outer channel wall 120 of the body 104 between the base 102 and the fuel nozzle tip 106.

The outer channel wall 120 includes a plurality of outer channel openings 132 positioned circumferentially about the outer channel wall 120 that provide fluid communication between the outer channel 118 and at least a portion of the swirler assembly 130. In this respect, fluid or gas, such as fuel which is injected or otherwise introduced into the outer channel 118 through a fuel connection to the outer channel 118, may be evacuated from the outer channel 118 through the plurality of outer channel openings 132 and exit a plurality of swirler openings 134 in the swirler assembly 130, so that the gas may be directed into a combustor of an associated gas turbine.

The inner channel wall 116 of the inner assembly 110 may be formed from multiple sections, as shown in FIG. 1, including sections in addition to those shown in the exemplary assembly 100 depicted in FIG. 1. The assembly 100 in FIG. 1 includes a base portion 136 that includes the plurality of inner channel openings 122 that provide fluid communication into the inner channel 114 (e.g., for cooling air), a first inner channel wall section 138, and a second inner channel wall section 140 that includes a convolution structure 111 that allows for expansion and contraction of the inner channel wall 116, to accommodate for thermal variation or gradient.

The assembly 100 shown in FIG. 1 comprises an original, or pre-constructed, fuel nozzle tip 106, which is coupled to a distal end 150 of the outer channel wall 120 and includes an end cover 142 that covers the distal end 108 of the body 104. In FIG. 1, the second inner channel wall section 140 is received at least partially, or extends into, a cavity 144 formed in the end cover 142 of the fuel nozzle tip 106. A distal end 148 of the inner channel wall 116 is coupled to a cavity wall 146 forming the cavity 144, and is brazed to the cavity wall 146 to secure the inner channel wall 116 to the end cover 142. The end cover 142 extends around the distal end 148 of the inner channel wall 116 and is also coupled and beam welded to the distal end 150 of the outer channel wall 120. In this respect, as shown in FIG. 1, the fuel nozzle tip 106 is secured to both the inner assembly 110 and the outer assembly 112. Additionally, outer surfaces 145, 147 of the outer channel wall 120 and the end cover 142, respectively, are axially aligned, or rather, are aligned linearly and axially down the length of the body 104.

Figure 2:
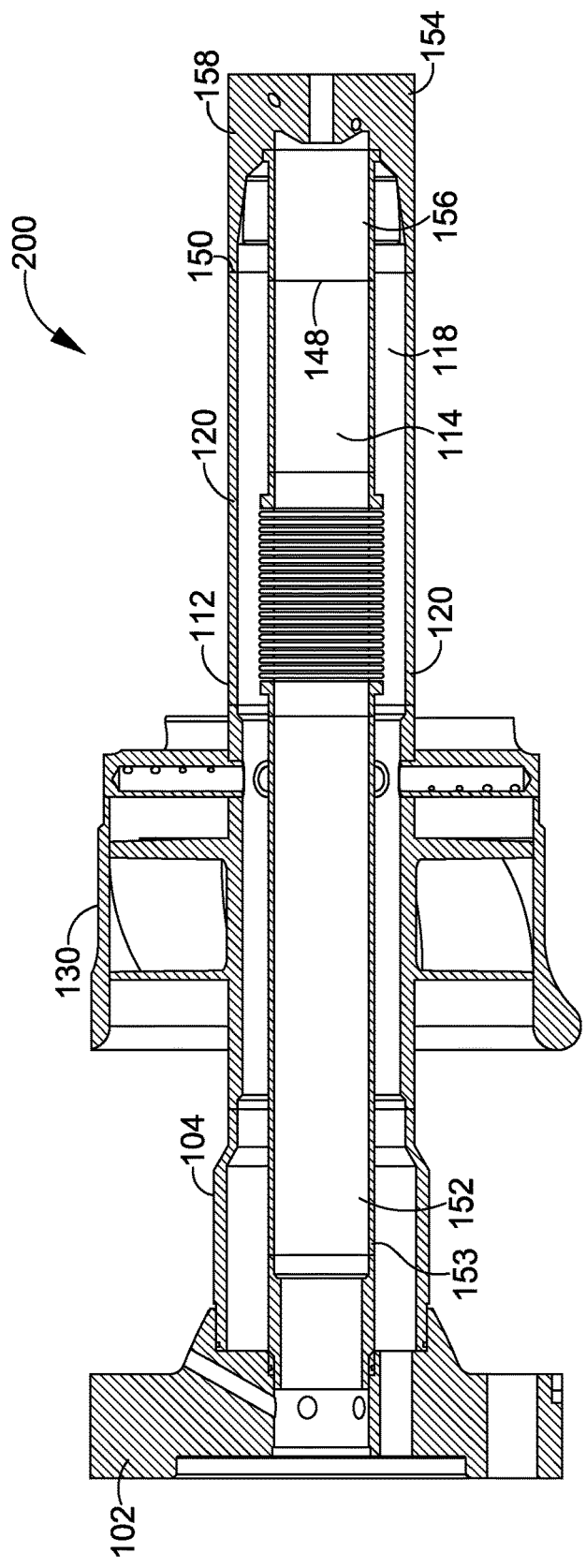
FIG. 2 is a cross-sectional view of the center fuel nozzle assembly of FIG. 1 after a reconditioning process has been performed, in accordance with an embodiment of the present invention.

Referring now to FIG. 2, a cross-sectional view of the assembly 100 of FIG. 1, after a reconditioning process is performed to produce the assembly 200, is provided, in accordance with an embodiment of the present invention. In FIG. 2, many of the components may be substantially the same as in the original assembly 100 shown in FIG. 1, including the base 102 and/or the swirler 130, for example, although these components may have structural alteration due to material removed, re-attached, and/or added to the reconditioned assembly 200 during the reconditioning process.

However, as will be described in greater detail in relation to FIGS. 3-12, which lay out an exemplary reconditioning process, the inner assembly 110 is replaced with a replacement inner assembly 152 having a replacement inner channel wall 153 that has been welded or otherwise joined to the base 102 within the body 104. Furthermore, a replacement fuel nozzle tip 154 is welded or otherwise joined to the replacement inner assembly 152 and to the outer assembly 112, to form the reconditioned assembly 200. The replacement fuel nozzle tip 154 includes an insert 156 that may be either beam welded or integrally formed with a replacement end cover 158 (i.e., form a single, unified component). In the assembly 200 shown in FIG. 2, the insert 156 is further beam welded to the distal end 148 of the replacement inner channel wall 153. The replacement end cover 158 is further coupled and joined to a distal end 150 of the outer channel wall 120.

Figure 3:
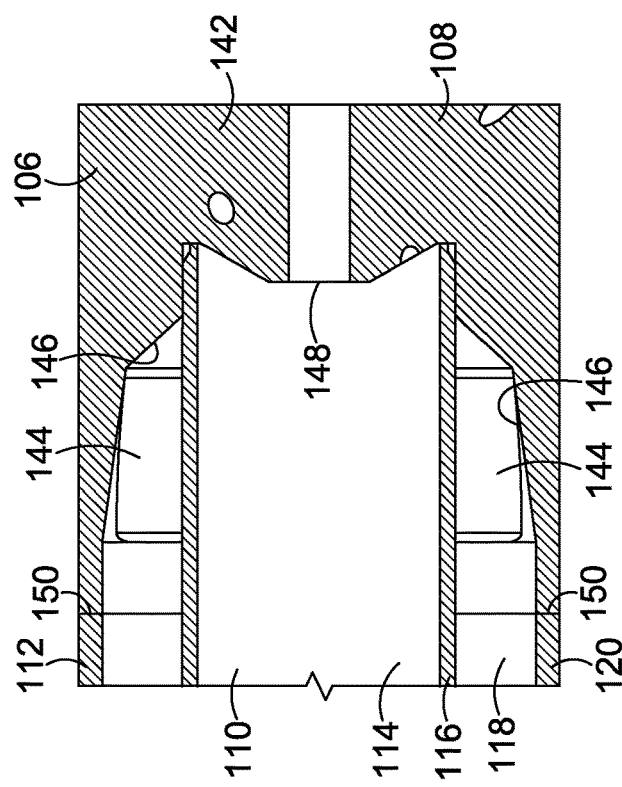
FIG. 3 is a fragmentary, cross-sectional view of a fuel nozzle tip attached to the assembly shown in FIG. 1, in accordance with an embodiment of the present invention.

Referring now to FIG. 3, a fragmentary, cross-sectional view of the fuel nozzle tip 106 attached to the assembly 100 shown in FIG. 1 is provided, in accordance with an embodiment of the present invention. In FIG. 3, the fragmentary view of the fuel nozzle tip 106 shows a portion of the inner assembly 110, the inner channel 114, the inner channel wall 116, the outer assembly 112, the outer channel 118, the outer channel wall 120, the cavity 144 having a cavity wall 146, the end cover 142, and the distal end 148 of the inner channel wall 116 which is beam welded to the cavity wall 146 of the end cover 142. As depicted in FIG. 3, the cavity 144 at least partially receives the distal end 148 of the inner channel wall 116.

Figure 4:
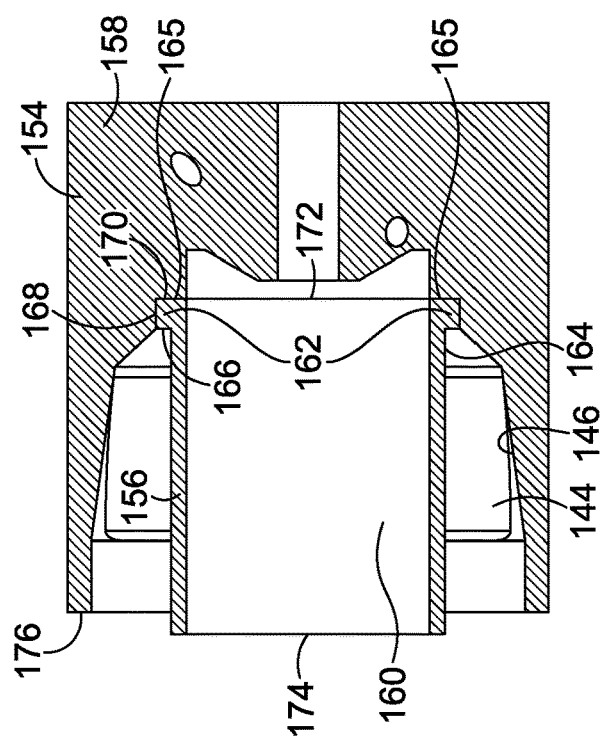
FIG. 4 is a fragmentary, cross-sectional view of a fuel nozzle tip attached to the reconditioned assembly shown in FIG. 2, in accordance with an embodiment of the present invention.

Referring now to FIG. 4, a fragmentary, cross-sectional view of a replacement fuel nozzle tip 154 which is joined to the assembly 200 shown in FIG. 2 is provided, in accordance with an embodiment of the present invention. The replacement fuel nozzle tip 154 shown in FIG. 4 includes an insert 156 that is joined (e.g., beam welded or integrally formed with the replacement fuel nozzle tip 154 as a single component) to a replacement end cover 158. The insert 156 may be hollow, or rather, may have a channel 160 that axially aligns with the inner channel 114 of the inner assembly 110 when the insert 156 and the inner channel wall 116 are beam welded together.

For embodiments not associated with an integrally formed insert and end cover, the insert 156 may further comprise, as shown in FIGS. 2 and 4, a shoulder 162 that extends from an outer surface 164 of the insert 156, the shoulder 162 positioned to engage the cavity wall 146 of the replacement end cover 158 to allow joining of the insert 156 to the cavity wall 146 and to the replacement end cover 158, forming the assembled, composite, replacement fuel nozzle tip 154, which can be used to replace the fuel nozzle tip 106 in the assembly 100 shown in FIG. 1.

The shoulder 162 of the insert 156 may be beam welded to a ledge 165 or a portion thereof in the cavity wall 146 of the replacement end cover 158, at which the insert 156 and the replacement end cover 158 may be coupled and joined, such as by welding. The shoulder 162 may have a first side 166, a second side 168, and a third side 170 (alternatively, the shoulder may have another shape or number of sides; additionally, the sides may blend together without clear delineations), at least some of which may be beam welded to the ledge 165. At least a portion of each of the second side 168 and the third side 170 may be coupled and joined to the ledge 165, such as by welding. This provides secure positioning of the insert 156 relative to the replacement end cover 158, forming a solid, composite, replacement fuel nozzle tip 154 for use in a reconditioned fuel nozzle assembly, such as the assembly 200 shown in FIG. 2.

Additionally, an inner end 172 of the insert 156 is positioned at least partially within the cavity 144 of the replacement end cover 158, and an outer end 174 of the insert 156 extends from the replacement end cover 158 towards a corresponding inner assembly 110 (not shown in FIG. 4 but present when the two are coupled). The replacement fuel nozzle tip 154 is provided such that the outer end 174 of the insert 156 is offset axially from an outer end 176 of the replacement end cover 158. The replacement fuel nozzle tip 154 may also be axially longer or shorter than the original fuel nozzle tip 106.

Figure 5:
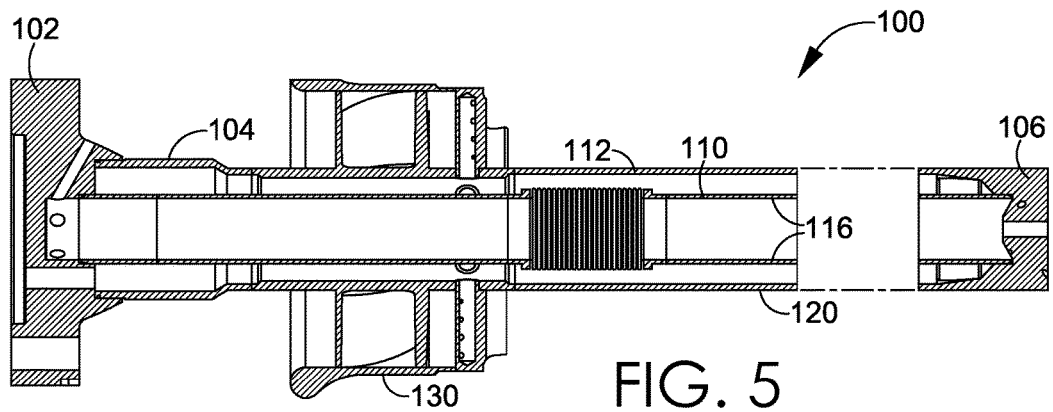
FIG. 5 is the assembly shown in FIG. 1 with the fuel nozzle tip shown in FIG. 3 removed from the assembly, in accordance with an embodiment of the present invention.

Referring now to FIG. 5, the assembly 100 shown in FIG. 1 is depicted with the fuel nozzle tip 106 removed from the assembly 100, in accordance with an embodiment of the present invention. The fuel nozzle tip 106 in the assembly 100 may be removed first to expose the interior of the body 104. Removing the fuel nozzle tip 106 may be accomplished in any number of ways, including milling or sawing the tip off of the body 104. Additionally, in certain removal circumstances, a portion of the inner channel wall 116 and/or a portion of the outer channel wall 120 may additionally be removed along with the fuel nozzle tip 106, depending on the reconditioning needs of a particular assembly. This additional material removal may be done if these portions of the inner and outer channel walls 116, 120 are damaged and in need of reconditioning.

Figure 6:
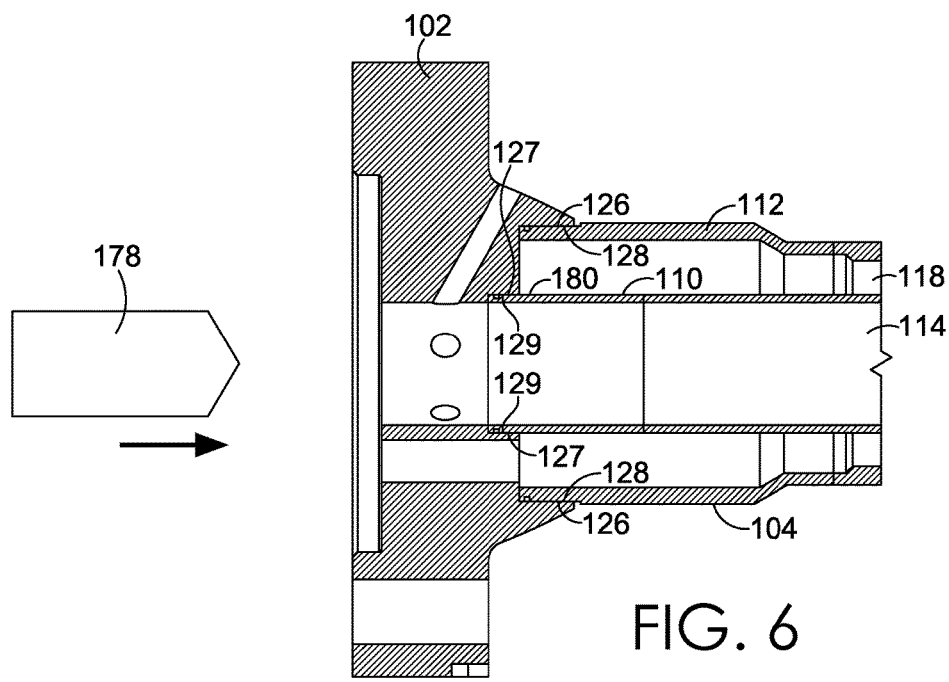
FIG. 6 is a fragmentary, cross-sectional view of the assembly shown in FIG. 1 illustrating removal of material from the base of the assembly during a reconditioning process, in accordance with an embodiment of the present invention.

Referring now to FIG. 6, a fragmentary, cross-sectional view of the assembly 100 shown in FIG. 1 illustrating removal of material from the base 102 of the assembly 100 during the reconditioning process is provided, in accordance with an embodiment of the present invention. In FIG. 6, the base 102 is shown with a milling device 178, which may alternatively be any other kind of material removal device, positioned to drill, mill, or otherwise remove material from the base 102 and/or, if needed, open a hole through the base 102, allowing access to the interior of the body 104. This milling process also allows a base end 180 of the inner channel wall 116 of the inner assembly 110 to be disconnected from the base 102 of the assembly 100. In this respect, the milling device 178 may at least partially remove the existing brazed connections between the base 102 and the inner assembly 110.

The milling device 178 is used to move material from the base 102 and/or possibly from the base end 180 of the inner channel wall 116 until the inner channel wall 116 is freed from connection to the base 102, so that it can be reconditioned. Remnants of material from the inner channel wall 116 may remain after the material removal process, such as remnants 182 shown in FIGS. 7A and 7B, or minimal or no remnants may be present.

Figure 7A:
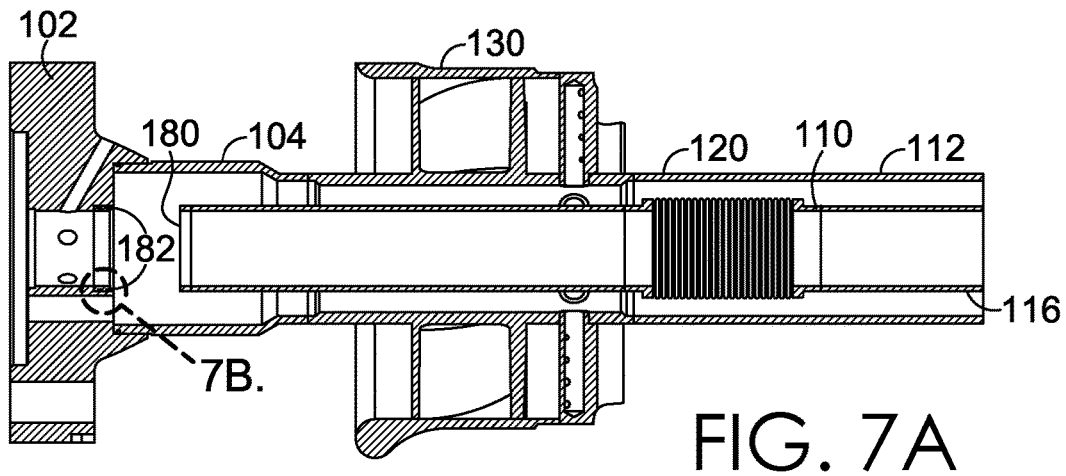
FIG. 7A is the assembly shown in FIG. 1 with the fuel nozzle tip removed and the inner assembly decoupled from the base, in accordance with an embodiment of the present invention.
Figure 7B:
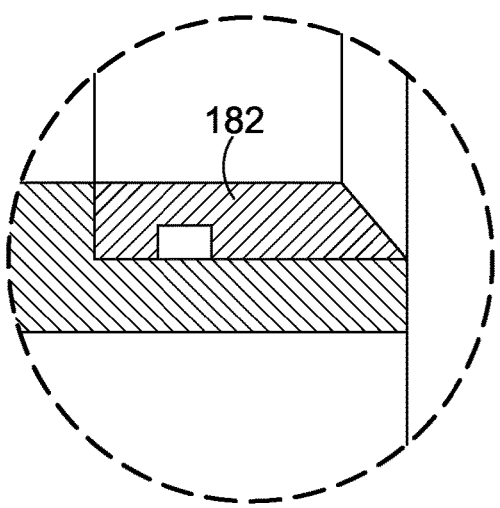
FIG. 7B is an enlarged, fragmentary view of remnants of the decoupled inner assembly in the assembly shown in FIG. 7A, in accordance with an embodiment of the present invention.

Referring now to FIG. 7A, the assembly 100 shown in FIG. 1 with the fuel nozzle tip 106 removed and the inner channel wall 116 decoupled from the base 102 is provided, in accordance with an embodiment of the present invention. In FIGS. 7A and 7B, a sufficient amount of material has been removed from the base 102 of the assembly 100 to allow the base end 180 of the inner channel wall 116 to be decoupled from the assembly 100, or rather, detached so that the inner channel wall 116 may be removed for replacement. Additionally, the removal of the fuel nozzle tip 106 provides a free-floating, fully decoupled inner assembly 110. Remnants 182 of the original joining process remain in the assembly 100. A replacement inner assembly may be machined to accommodate for these remnants 182. Alternatively, additional material removal processes may be used to remove the remnants 182.

Figure 8:
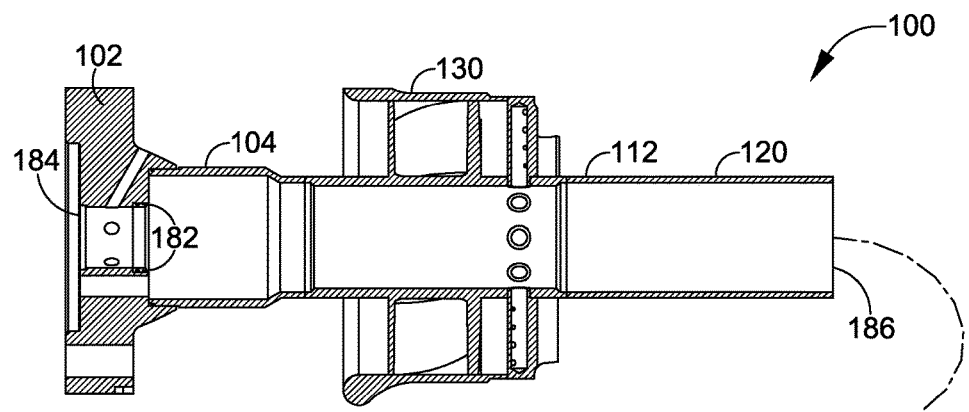
FIG. 8 is the assembly shown in FIG. 1 with the inner assembly decoupled and removed, in accordance with an embodiment of the present invention.
Figure 9:
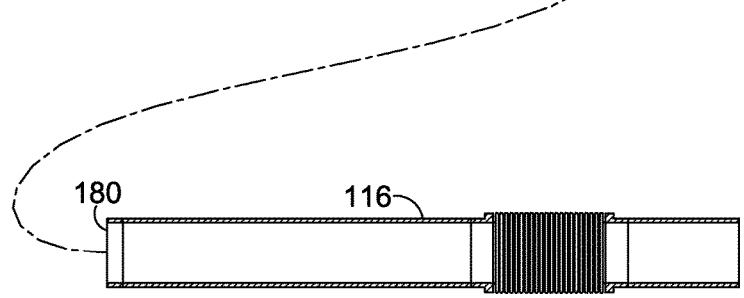
FIG. 9 is a cross-sectional view of a replacement fuel nozzle tip, in accordance with an embodiment of the present invention.
Figure 9:
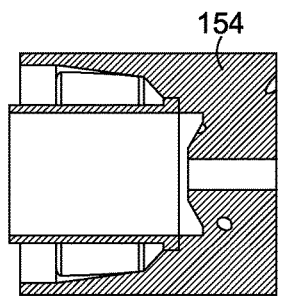
Figure 10:
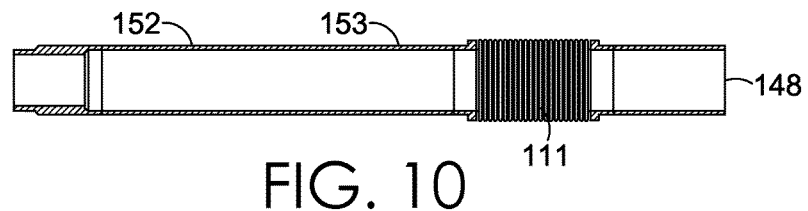
FIG. 10 is a side-elevation view of a replacement inner assembly for the center fuel nozzle assembly shown in FIG. 1, in accordance with an embodiment of the present invention.
Figure 11:
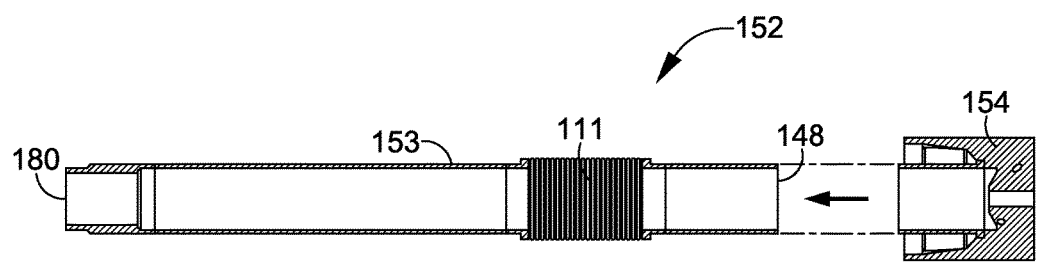
FIG. 11 is the replacement fuel nozzle tip of FIG. 9 and the replacement inner assembly of FIG. 10 prepared for joining, in accordance with an embodiment of the present invention.

Referring now to FIG. 8, the assembly 100 shown in FIG. 1 with the inner assembly 110 including the inner channel wall 116 decoupled and removed from the body 104 during the reconditioning process is provided, in accordance with an embodiment of the present invention. In FIG. 8, a first end 184 and a second end 186 of the assembly 100 are open and exposed. In FIG. 9, the replacement fuel nozzle tip 154 for the assembly 200 is provided, in accordance with an embodiment of the present invention. In FIG. 10, a replacement inner assembly 152 having a replacement inner channel wall 153, which includes a convolution structure 111 and a distal end 148, is provided. The replacement inner assembly 152 may be formed from multiple sections like the inner assembly 110 in FIG. 1 that are coupled and joined together, and may have different sized sections than inner assembly 110, to accommodate for different sized replacement pieces. In FIG. 11, the replacement inner assembly 152 and the replacement fuel nozzle tip 154 are shown aligned so that they may be beam welded as part of the reconditioning process.

Figure 12:
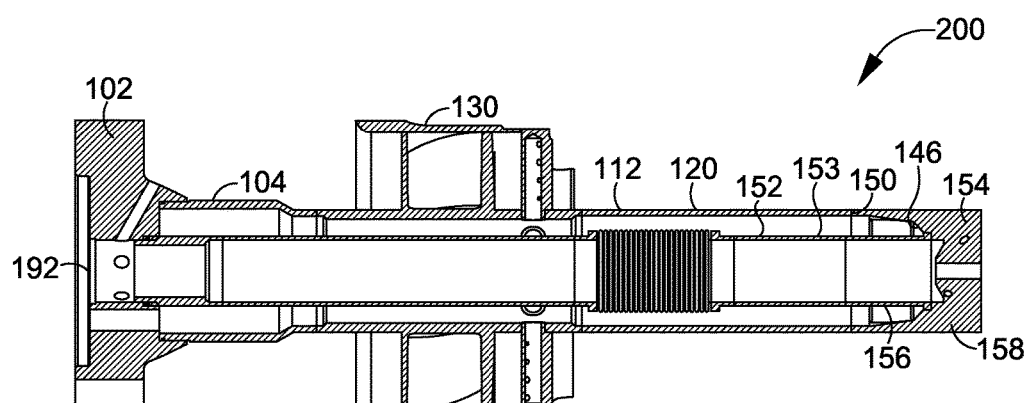
FIG. 12 is a cross-sectional view of the assembled, reconditioned fuel nozzle assembly after the replacement fuel nozzle tip and the replacement inner assembly have been installed, in accordance with an embodiment of the present invention.

Referring now to FIG. 12, a cross-sectional view of the assembled, reconditioned fuel nozzle assembly 200 shown in FIG. 2, after a replacement fuel nozzle tip 154 and replacement inner assembly 152 have been installed, is provided, in accordance with an embodiment of the present invention. The replacement inner channel wall 153 of the replacement inner assembly 152 has been beam welded to the base 102 of the assembly 200, and a plug 192 (or some other component or material) has been applied to an access opening in the base 102, sealing the access opening (this may or may not be necessary, depending on whether a pre-existing access opening was available in the base 102 and/or whether an opening is desired).

Additionally, the replacement fuel nozzle tip 154 has been beam welded to the replacement inner assembly 152 and to the outer assembly 112. In this regard, the insert 156 of the replacement fuel nozzle tip 154 has been beam welded to the distal end 148 of the replacement inner channel wall 153, and the distal end 150 of the outer channel wall 120 has been joined to the replacement end cover 158 which is joined to the insert 156 at the cavity wall 146 of the replacement end cover 158. As shown in FIG. 12, a similar structure as the assembly 100 is provided. However, a replacement fuel nozzle tip 154 and replacement inner assembly 152 are installed with minimal removal of other material, and with reuse of existing parts, including at least a portion of the base 102, the outer channel wall 120, and the swirler assembly 130, among other parts. Different components can be replaced or reused, depending on the reconditioning needs of a particular assembly.

Figure 13A:
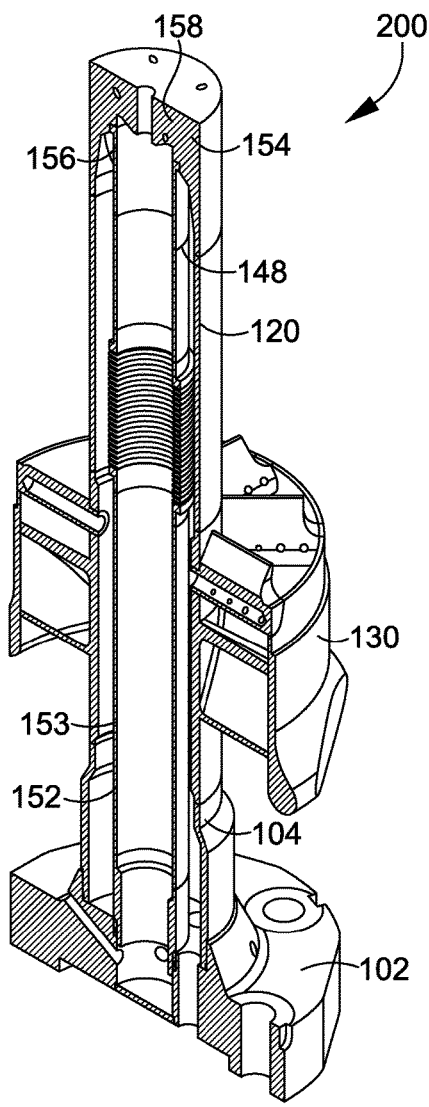
FIG. 13A is an angled, perspective, cross-sectional view of a reconditioned center fuel nozzle assembly, in accordance with an embodiment of the present invention.
Figure 13B:
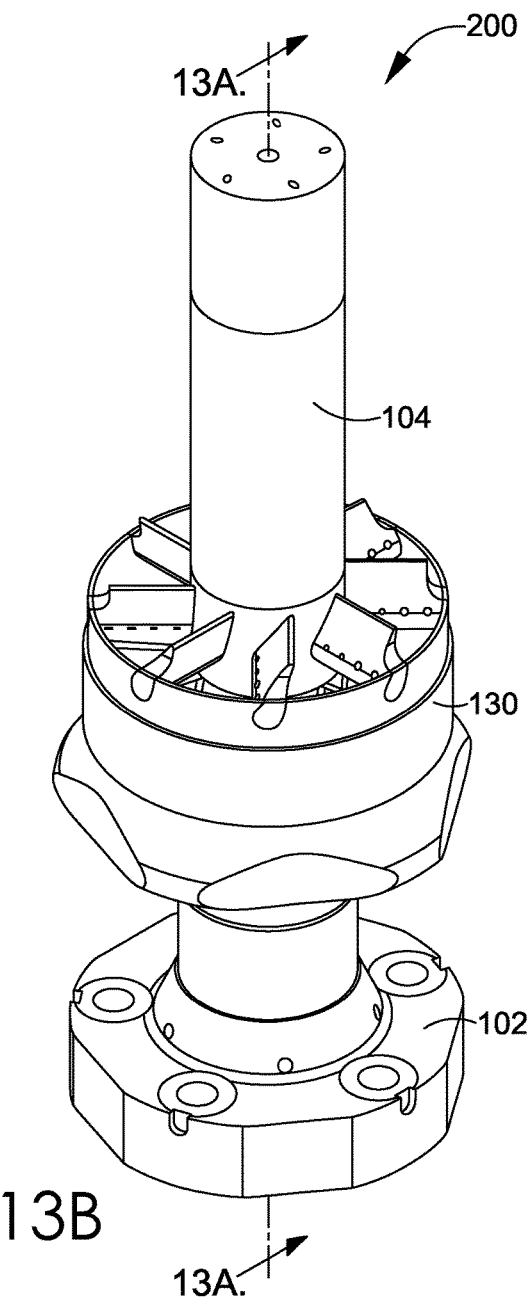
FIG. 13B is an angled, perspective view of the reconditioned center fuel nozzle assembly shown in FIG. 13A, in accordance with an embodiment of the present invention.

Referring now to FIG. 13A, an angled, perspective, cross-sectional view of the reconditioned center fuel nozzle assembly 200 shown in FIG. 2 is provided, in accordance with an embodiment of the present invention. In FIG. 13A, the replacement fuel nozzle tip 154 is shown joined to the body 104 of the assembly 200 at the distal end 148 of the replacement inner channel wall 153 and at the distal end 150 of the outer channel wall 120. FIG. 13B depicts a non-cross-sectional, angled, perspective view of the reconditioned center fuel nozzle assembly 200 shown in FIGS. 2 and 13A, in accordance with an embodiment of the present invention.

Figure 14:
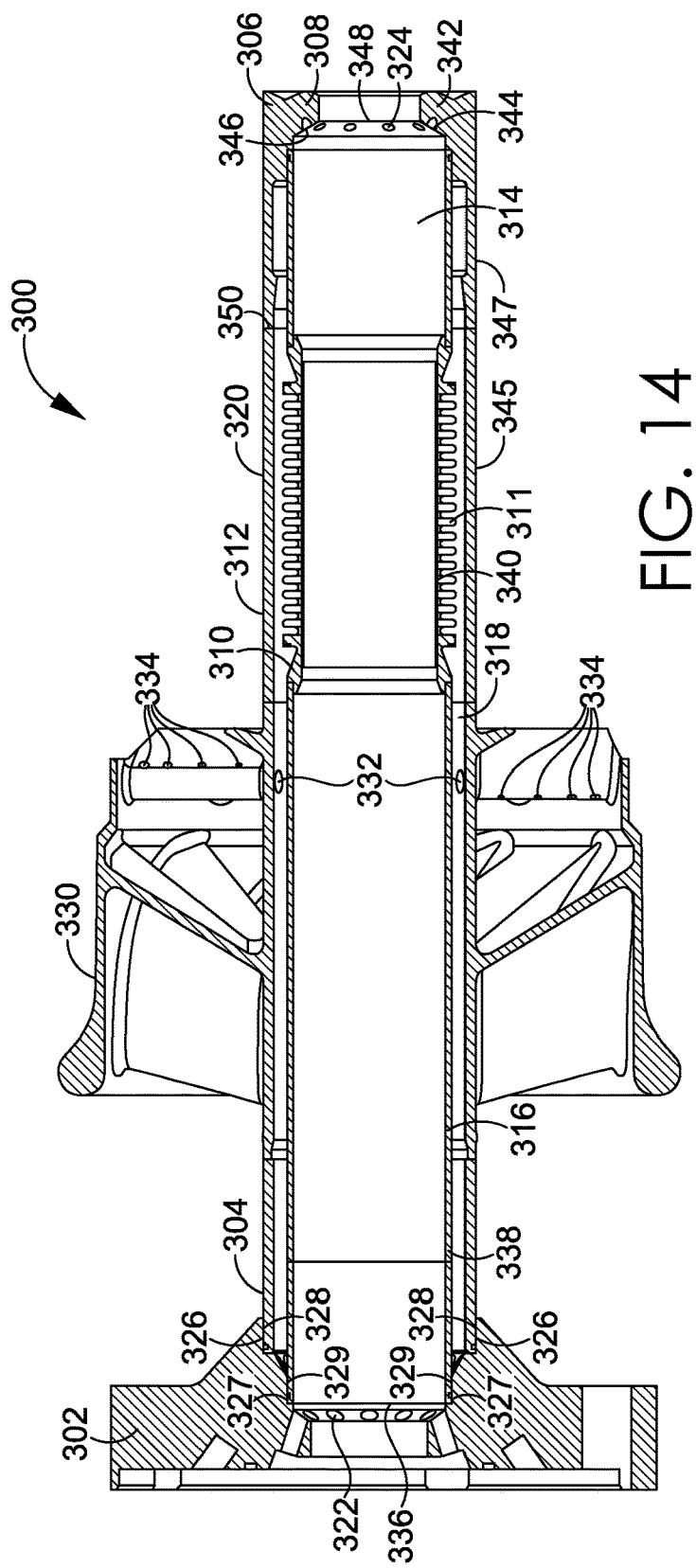
FIG. 14 is a cross-sectional view of an exemplary pre-assembled outer fuel nozzle assembly for a gas turbine, in accordance with an embodiment of the present invention.

Referring now to FIG. 14, a cross-sectional view of an exemplary pre-assembled outer fuel nozzle assembly 300 for a gas turbine is provided, in accordance with an embodiment of the present invention. In FIG. 14, the assembly 300 is similar to the assemblies 100 and 200 shown in FIGS. 1 and 2, respectively, but differs in construction to accommodate for different placement, use, components, and/or function within a combustor. Once again, any design of a fuel nozzle assembly may utilize the reconditioning process described herein, and the assemblies 100, 300 discussed herein are intended to be exemplary and non-limiting.

As discussed with respect to the center fuel nozzle construction, traditional outer fuel nozzle assemblies often utilize ductile braze materials capable of operation in high temperature environments. To achieve necessary ductility design requirements, these braze materials often utilize costly precious metals, such as gold, palladium, and/or platinum, for example. Reconditioning of brazed fuel nozzles requires fuel nozzle disassembly down to component constituents, including diffusion zone removal within the base metal about each braze joint. This material removal may limit the number of reconditioning cycles for an outer fuel nozzle assembly, in certain circumstances, to as little as approximately three repairs. The complex geometry of the outer fuel nozzle assembly and inherent difficulty in reaching specific affixation junctures often makes techniques other than brazing difficult to use. As a result, a fuel nozzle reconditioning and manufacturing/fabrication process, such as those described herein, are desirable.

In FIG. 14, the assembly 300 includes a base 302 and a body 304 extending from the base 302 to a fuel nozzle tip 306, which is coupled to the body 304 at an end 308 of the body 304 opposite the base 302. Furthermore, the assembly 300 includes an inner assembly 310 and an outer assembly 312. The inner assembly 310 includes an inner channel 314 that is at least partially defined by an inner channel wall 316 which extends at least part of the way through the body 304. The outer assembly 312 includes an outer channel 318 that is at least partially defined by the inner channel wall 316 and an outer channel wall 320. The outer channel 318 is generally the space between the inner channel wall 316 and the outer channel wall 320. The assembly 300 may be configured such that there is no fluid communication between the inner channel 314 and the outer channel 318.

The inner channel 314 includes a plurality of inner channel openings 322 at or near the base 302 that provide fluid communication with the inner channel 314. In this respect, the plurality of inner channel openings 322 may be used to provide cooling fluid or gas (e.g., air) to the inner channel 314 to cool the assembly 300 during operation of the associated combustor. Furthermore, in FIG. 14, the inner channel 314 is in fluid communication with an outside environment through a plurality of openings 324 in the fuel nozzle tip 306, to allow the fluid or gas to evacuate the inner channel 314 through the plurality of openings 324 into an associated combustor. In various embodiments, the assembly 300, or the other assemblies discussed herein, may receive fuel through a fuel connection in fluid communication with the inner channel 314 so that fuel may be provided to the combustor through the plurality of openings 324. Different air, air-fuel, and/or fuel-supplying designs are possible and contemplated. The body 304 is brazed or otherwise joined to the base 302 at base edges 326, 327 of the body 304 and base edges 328, 329 of the base 302. Additionally, a swirler assembly 330 is coupled to the outer channel wall 320 of the body 304 between the base 302 and the fuel nozzle tip 306.

The outer channel wall 320 includes a plurality of outer channel openings 332 positioned circumferentially about the outer channel wall 320 that provide fluid communication between the outer channel 318 and at least a portion of the swirler assembly 330. In this respect, fluid or gas, such as fuel which is injected or otherwise introduced into the outer channel 318 through a fuel connection to the outer channel 318, may be evacuated from the outer channel 318 through the plurality of outer channel openings 332 and exit a plurality of swirler openings 334 in the swirler assembly 330, so that the gas may be directed into a combustor of an associated gas turbine.

The inner channel wall 316 of the inner assembly 310 may be formed from multiple sections, as shown in FIG. 14, including sections in addition to those shown in the exemplary assembly 300 depicted in FIG. 14. The assembly 300 includes a base portion 336 that includes the plurality of inner channel openings 322 that provide fluid communication into the inner channel 314 (e.g., for cooling air), a first inner channel wall section 338, and a second inner channel wall section 340 that includes a convolution structure 311 that allows for expansion and contraction of the inner channel wall 316 to relieve thermal strain.

The assembly 300 shown in FIG. 14 includes the pre-assembled or pre-installed fuel nozzle tip 306, which is coupled to the end 308 of the body 304 and includes an end cover 342 that covers the end 308 of the body 304. In FIG. 14, the second inner channel wall section 340 is received at least partially, or extends into, a cavity 344 formed in the end cover 342 of the fuel nozzle tip 306. A distal end 348 of the inner channel wall 316 is coupled to a cavity wall 346 of the end cover 342, and is brazed to the cavity wall 346 to secure the inner channel wall 316 to the end cover 342. The end cover 342 extends around the distal end 348 of the inner channel wall 316, and also, is coupled to a distal end 350 of the outer channel wall 320. In this respect, as shown in FIG. 14, the fuel nozzle tip 306 is secured to both the inner assembly 310 and the outer assembly 312. Additionally, outer surfaces 345, 347 of the outer channel wall 320 and the end cover 342, respectively, are axially aligned, or rather, are aligned substantially linearly down the axial length of the body 304.

Figure 15:
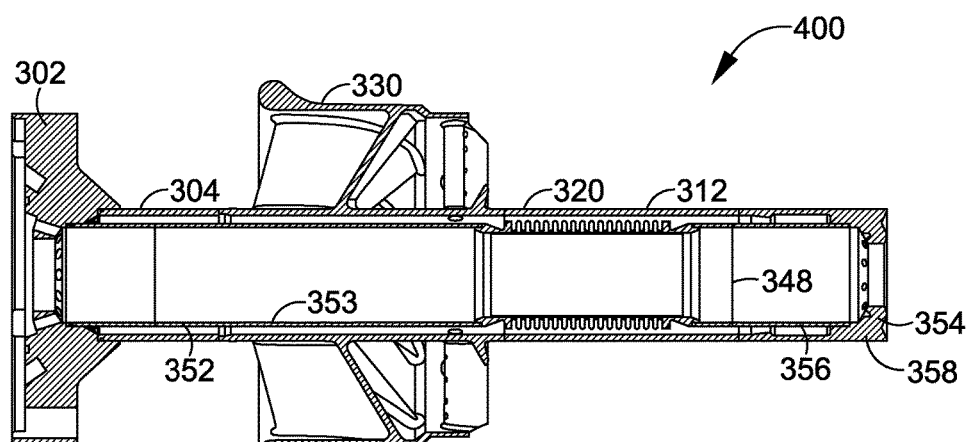
FIG. 15 is a cross-sectional view of the outer fuel nozzle assembly of FIG. 1 after a reconditioning process has been performed, in accordance with an embodiment of the present invention.

Referring now to FIG. 15, a cross-sectional view of a reconditioned outer fuel nozzle assembly 400 is provided, in accordance with an embodiment of the present invention. In FIG. 15, many of the components may be the same as in the original assembly shown in FIG. 14, including at least part of the base 302, the outer channel wall 320, and/or the swirler assembly 330, for example, although these components may have structural alterations due to material removed, replaced, and/or changed during the reconditioning process.

However, as will be described in greater detail in relation to FIGS. 16-23, which lay out an exemplary reconditioning process for the exemplary pre-assembled outer fuel nozzle assembly 300 shown in FIG. 14, the inner assembly 310 is replaced with a replacement inner assembly 352 that is beam welded to the base 302. Furthermore, a replacement fuel nozzle tip 354 is beam welded to the replacement inner assembly 352 and to the outer assembly 312, to form the reconditioned assembly 400. The replacement fuel nozzle tip 354 comprises an insert 356 that is either beam welded to, or integrally formed with, a replacement end cover 358. In the reconditioned assembly 400 shown in FIG. 15, the insert 356 is further beam welded to the distal end 348 of the replacement inner channel wall 353.

Figure 16:
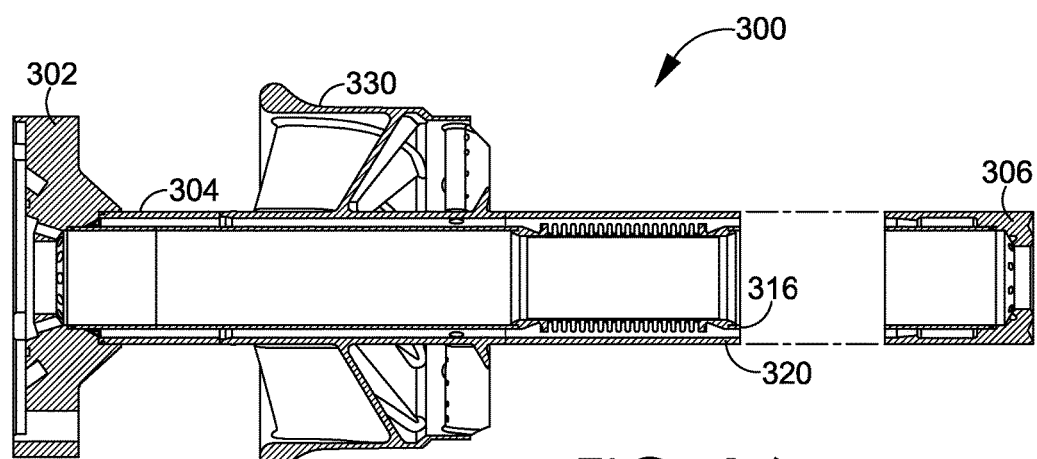
FIG. 16 is the assembly shown in FIG. 14 with a pre-installed fuel nozzle tip removed, in accordance with an embodiment of the present invention.

Referring now to FIG. 16, the assembly 300 shown in FIG. 14 is depicted with the fuel nozzle tip 306 removed from the assembly 300, in accordance with an embodiment of the present invention. The fuel nozzle tip 306 of the assembly 300 may be removed first to expose the interior of the body 304 of the assembly 300. Removing the fuel nozzle tip 306 may be accomplished in any number of ways, including milling or sawing the fuel nozzle tip 306 off of the body 304. Additionally, in certain removal circumstances, a portion of the inner channel wall 316 and/or a portion of the outer channel wall 320 may additionally be removed along with the fuel nozzle tip 306, depending on the reconditioning needs of a particular assembly. This additional material removal may be performed if these portions of the inner and outer channel walls 316, 320 are damaged and in need of reconditioning.

Figure 17:
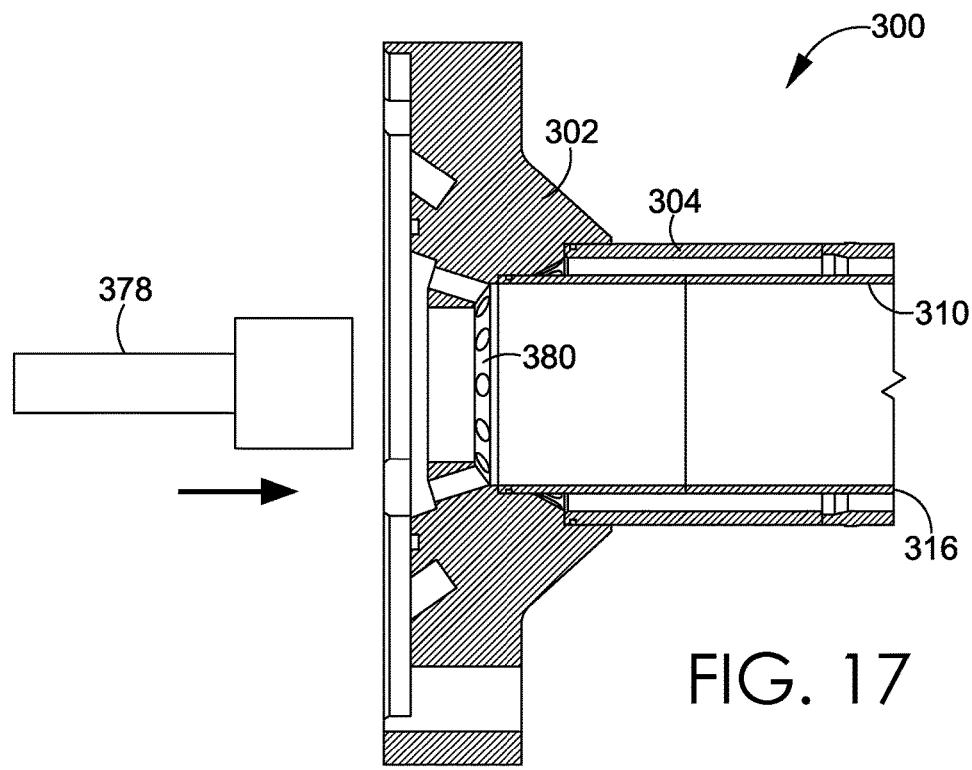
FIG. 17 is a fragmentary, cross-sectional view of a base of the assembly shown in FIG. 14, in accordance with an embodiment of the present invention.

Referring now to FIG. 17, a fragmentary, cross-sectional view of the assembly 300 shown in FIG. 14 illustrating removal of material from the base 302 of the assembly 300 during the reconditioning process is provided, in accordance with an embodiment of the present invention. In FIG. 17, the base 302 is shown with a milling device 378, which may alternatively be any other kind of material removal device, positioned to drill, mill, or otherwise remove material from the base 302 to allow a base end 380 of the inner channel wall 316 of the inner assembly 310 to be disconnected from the base 302 of the assembly 300. In this respect, the milling device 378 may at least partially remove the existing brazed connections between the base 302 and the inner assembly 310. As with assembly 100 shown in FIG. 1, additional material removal may be performed from the tip side of the body 304.

The milling device 378 is used to remove material from the base 302 and the base end 380 of the inner channel wall 316 until the inner channel wall 316 is freed from connection to the base 302, so that it can be removed. In the assembly 300 shown in FIG. 17, there may be no base material to remove to provide access, as an access hole may already be present. Remnants of material from the inner channel wall 316 may remain after the material removal process, or minimal or no remnants may be present, depending on the construction of the assembly 300 and the removal process used.

Figure 18:
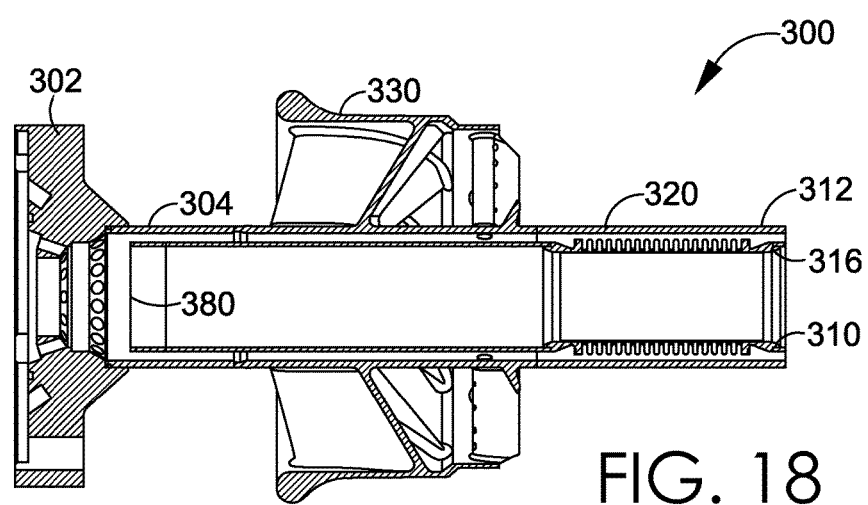
FIG. 18 is a fragmentary, cross-sectional view of the assembly shown in FIG. 14 with a pre-installed fuel nozzle tip removed and a pre-installed inner assembly decoupled from a base of the assembly, in accordance with an embodiment of the present invention.
Figure 19:
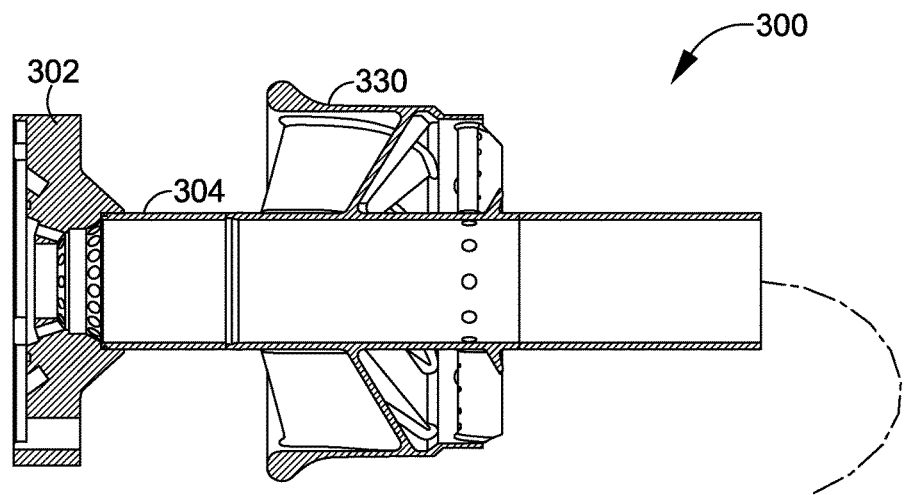
FIG. 19 is the assembly shown in FIG. 18 with the inner assembly removed from the body of the assembly, in accordance with an embodiment of the present invention.

Referring now to FIG. 18, the assembly 300 shown in FIG. 14 with the fuel nozzle tip 306 removed and the inner channel wall 316 of the inner assembly 310 decoupled from the base 302 is provided, in accordance with an embodiment of the present invention. In FIG. 18, a sufficient amount of material has been removed from the base 302 of the assembly 300 to allow the base end 380 of the inner channel wall 316 to be decoupled from the base 302, or rather, detached so that the inner assembly 310 may be removed for replacement. Additionally, the removal of the fuel nozzle tip 306 as shown in FIG. 16 provides a free-floating, fully decoupled inner assembly 310 which can then be removed from the body 304. A replacement inner assembly may be fabricated or provided and beam welded to the base 302. Referring now to FIG. 19, the decoupled inner channel wall 316 of the inner assembly 310 is shown being removed from the body 304 of the assembly 300.

Figure 20:
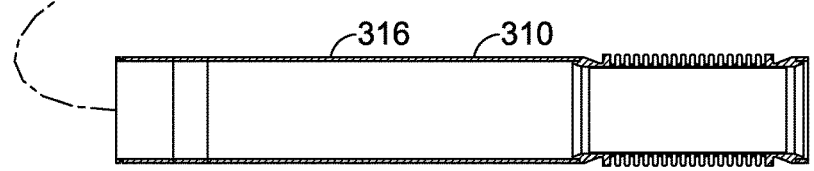
FIG. 20 is a cross-sectional view of a replacement fuel nozzle tip for the assembly shown in FIG. 14, in accordance with an embodiment of the present invention.
Figure 20:
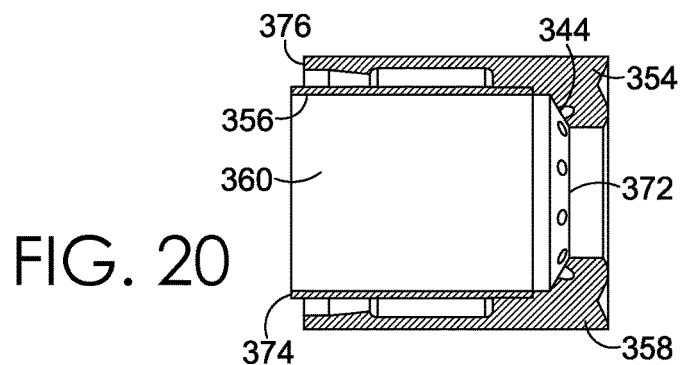

Referring now to FIG. 20, a replacement fuel nozzle tip 354 for the assembly 300 is provided, in accordance with an embodiment of the present invention. In FIG. 20, the replacement fuel nozzle tip 354 comprises an insert 356 that is either beam welded to, or integrally formed with, the replacement end cover 358. The insert 356 may be hollow, or rather, may have a channel 360 that axially aligns with the inner channel 314 of the inner channel wall 316 of the inner assembly 310, when the insert 356 and the inner channel wall 316 are beam welded together.

Additionally, an inner end 372 of the insert 356 is positioned at least partially within a cavity 344 of the replacement end cover 358, and an outer end 374 of the insert 356 extends from the replacement end cover 358 towards a corresponding inner assembly 310 (when the inner assembly 310 is coupled to the insert 356). The replacement fuel nozzle tip 354 is provided such that the outer end 374 of the insert 356 is offset axially from an outer end 376 of the replacement end cover 358. The replacement fuel nozzle tip 354 may also be axially longer or shorter than the fuel nozzle tip 306.

Figure 21:
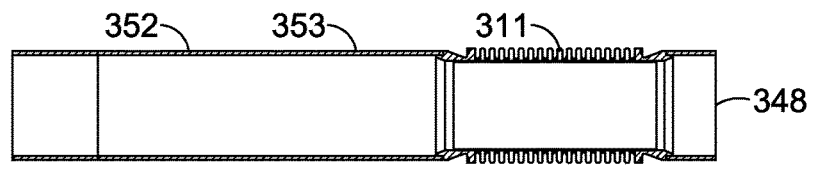
FIG. 21 is a side-elevation view of a replacement inner assembly for the assembly shown in FIG. 14, in accordance with an embodiment of the present invention.
Figure 22:
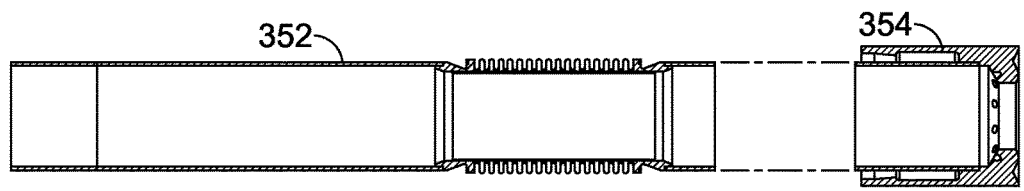
FIG. 22 shows the replacement inner assembly of FIG. 21 and the replacement fuel nozzle tip of FIG. 20 ready for assembly, in accordance with an embodiment of the present invention.

Referring now to FIG. 21, a replacement inner assembly 352, which comprises a replacement inner channel wall 353 having a convolution structure 311 and a distal end 348, is provided. The replacement inner assembly 352 may be formed from multiple sections that are coupled and beam welded together, and may have different sized sections than the inner assembly 310, to accommodate for different sized replacement pieces. In FIG. 22, the replacement inner assembly 352 and the replacement fuel nozzle tip 354 are shown aligned so that they may be coupled and beam welded as part of the reconditioning process.

Figure 23:
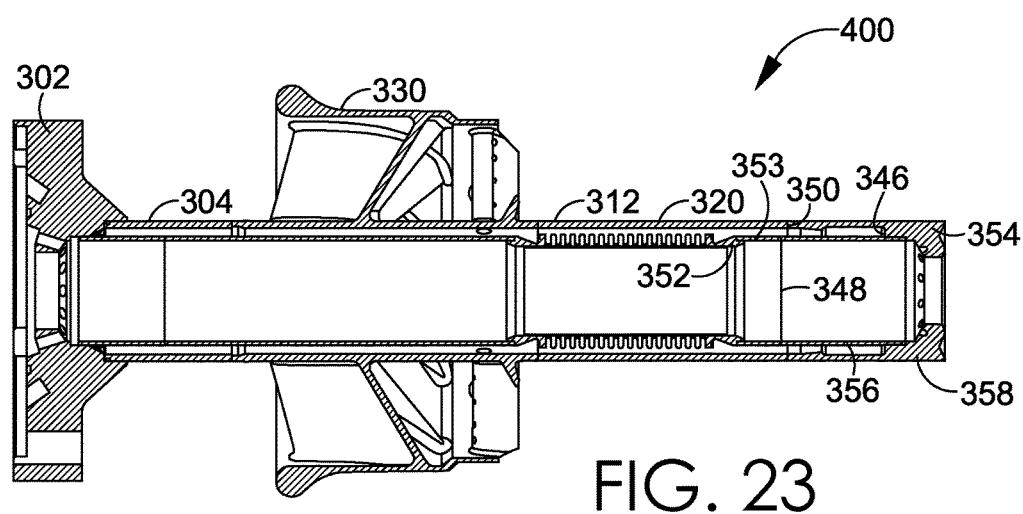
FIG. 23 is a cross-sectional view of the reconditioned outer fuel nozzle assembly with the replacement fuel nozzle tip and the replacement inner assembly installed, in accordance with an embodiment of the present invention.

Referring now to FIG. 23, a cross-sectional view of the assembled, reconditioned outer fuel nozzle assembly 400, after a replacement fuel nozzle tip 354 and the replacement inner assembly 352 have been installed, is provided, in accordance with an embodiment of the present invention. The replacement inner channel wall 353 of the replacement inner assembly 352 has been beam welded to the base 302 of the reconditioned assembly 400 and to the replacement fuel nozzle tip 354.

Additionally, the replacement fuel nozzle tip 354 has been beam welded to the replacement inner channel wall 353 and the outer channel wall 320. In this regard, the insert 356 of the replacement fuel nozzle tip 354 has been beam welded to the distal end 348 of the replacement inner channel wall 353, and the distal end 350 of the outer channel wall 320 has been joined to the replacement end cover 358, which is beam welded to the insert 356 at the cavity wall 346 of the end cover 358. As shown in FIG. 23, a similar structure as the assembly 300 shown in FIG. 14 is provided, however, the replacement fuel nozzle tip 354 and the replacement inner assembly 352 are installed with minimal removal of material, and with reuse of existing parts, including at least a portion of the base 302, outer channel wall 320, and swirler assembly 330, among others. Different components can be replaced or reused, depending on the reconditioning needs of a particular assembly.

Figure 24A:
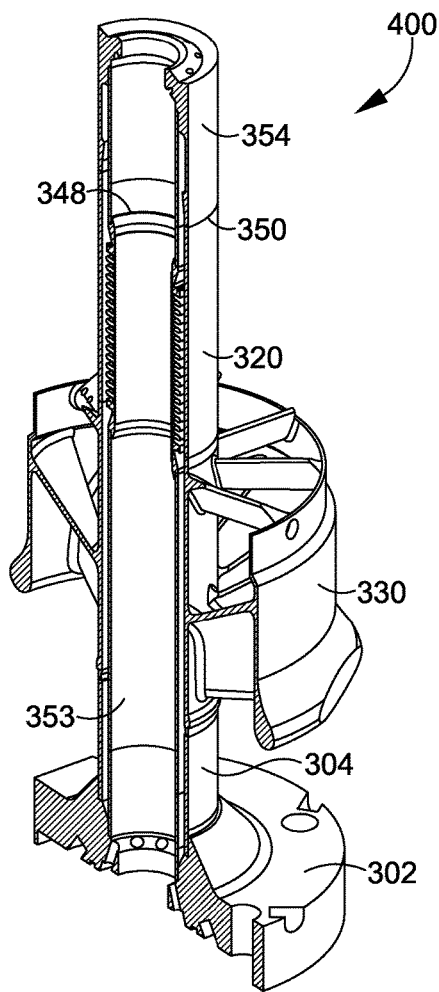
FIG. 24A is an angled, perspective, cross-sectional view of an assembled and reconditioned outer fuel nozzle assembly, in accordance with an embodiment of the present invention.
Figure 24B:
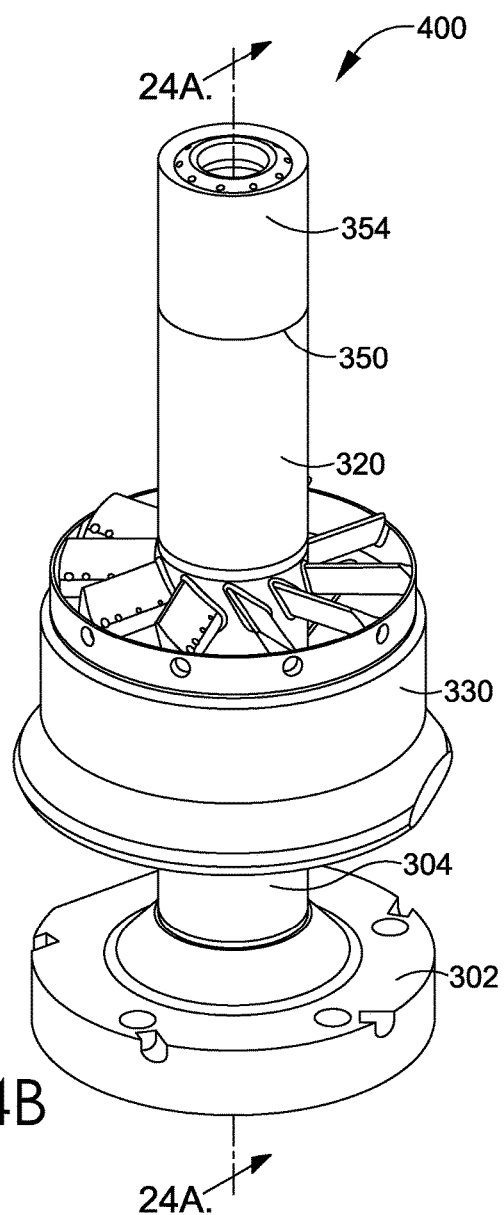
FIG. 24B is an angled, perspective view of the assembled and reconditioned outer fuel nozzle assembly shown in FIG. 24A, in accordance with an embodiment of the present invention.

Referring now to FIG. 24A, an angled, perspective, cross-sectional view of the reconditioned outer fuel nozzle assembly 400 is provided, in accordance with an embodiment of the present invention. In FIG. 24A, the replacement fuel nozzle tip 354 is shown joined to the body 304 of the reconditioned assembly 400 at the distal end 348 of the replacement inner channel wall 353 and at the distal end 350 of the outer channel wall 320. FIG. 24B depicts a non-cross-sectional, angled, perspective view of the reconditioned outer fuel nozzle assembly 400 shown in FIG. 24A, in accordance with an embodiment of the present invention.

Figure 25:
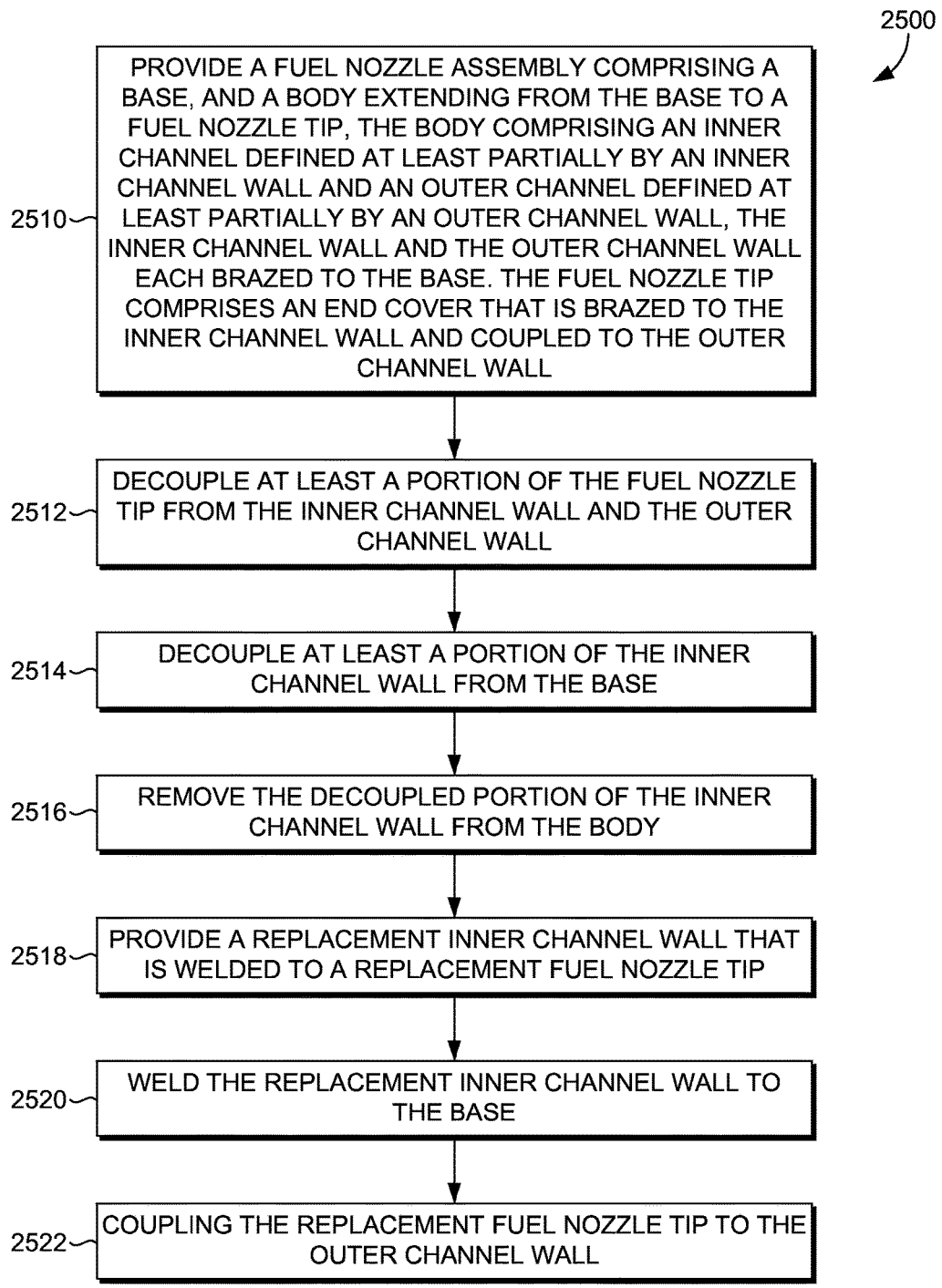
FIG. 25 is a block diagram of a first exemplary method of reconditioning a fuel nozzle assembly, in accordance with an embodiment of the present invention.

Referring now to FIG. 25, a block diagram 2500 of a first exemplary method for reconditioning fuel nozzle assemblies is provided, in accordance with an embodiment of the present invention. At a first block 2510, a fuel nozzle assembly, such as the fuel nozzle assembly 100 shown in FIG. 1, is provided. The fuel nozzle assembly comprises a base, such as the base 102 shown in FIG. 1, and a body, such as the body 104 shown in FIG. 1, extending from the base to a fuel nozzle tip, such as the fuel nozzle tip 106 shown in FIG. 1. The body comprises an inner channel, such as the inner channel 114 shown in FIG. 1, defined at least partially by an inner channel wall, such as the inner channel wall 116 shown in FIG. 1, and an outer channel, such as the outer channel 118 shown in FIG. 1, defined at least partially by an outer channel wall, such as the outer channel wall 120 shown in FIG. 1. The inner channel wall and the outer channel wall are each brazed to the base. The fuel nozzle tip comprises an end cover, such as the end cover 142 shown in FIG. 1, that is brazed to the inner channel wall and coupled to the outer channel wall.

At a second block 2512, at least a portion of the fuel nozzle tip is decoupled from the inner channel wall and the outer channel wall. At a third block 2514, at least a portion of the inner channel wall is decoupled from the base. At a fourth block 2516, the decoupled portion of the inner channel wall is removed from the body. At a fifth block 2518, a replacement inner channel wall, such as the replacement inner channel wall 153 shown in FIG. 2, is provided that is welded to a replacement fuel nozzle tip, such as the replacement fuel nozzle tip 154 shown in FIG. 2. At a sixth block 2520, the replacement inner channel wall is welded to the base. At a seventh block 2522, the replacement fuel nozzle tip is coupled to the outer channel wall.

Figure 26:
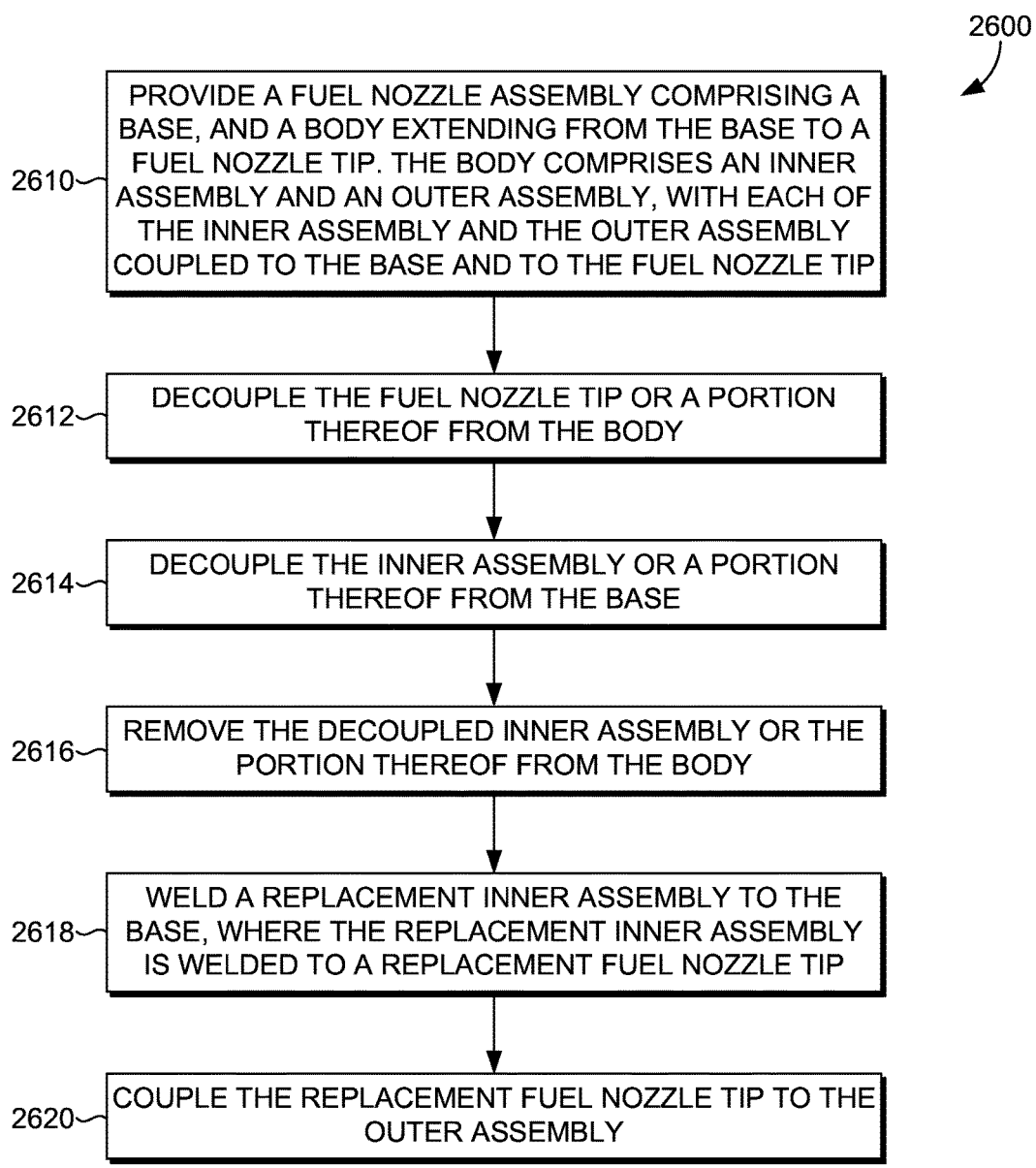
FIG. 26 is a block diagram of a second exemplary method of reconditioning a fuel nozzle assembly, in accordance with an embodiment of the present invention.

Referring now to FIG. 26, a block diagram 2600 of a second exemplary method for producing fuel nozzle assemblies is provided, in accordance with an embodiment of the present invention. At a first block 2610, a fuel nozzle assembly, such as the fuel nozzle assembly 100 shown in FIG. 1, is provided. The fuel nozzle assembly comprises a base, such as the base 102 shown in FIG. 1, a body, such as the body 104 shown in FIG. 1, extending from the base to a fuel nozzle tip, such as the fuel nozzle tip 106 shown in FIG. 1. The body comprises an inner assembly, such as the inner assembly 110 shown in FIG. 1, and an outer assembly, such as the outer assembly 112 shown in FIG. 1. Each of the inner assembly and the outer assembly is coupled to the base and to the fuel nozzle tip.

At a second block 2612, the fuel nozzle tip or a portion thereof is decoupled from the body. At a third block 2614, the inner assembly or a portion thereof is decoupled from the base. At a fourth block 2616, the decoupled inner assembly or the portion thereof is removed from the body. At a fifth block 2618, a replacement inner assembly, such as the replacement inner assembly 152 shown in FIG. 2, is welded to the base, the replacement inner assembly being welded to a replacement fuel nozzle tip, such as the replacement fuel nozzle tip 154 shown in FIG. 2. At a block 2620, the replacement fuel nozzle tip is coupled to the outer assembly.

Figure 27:
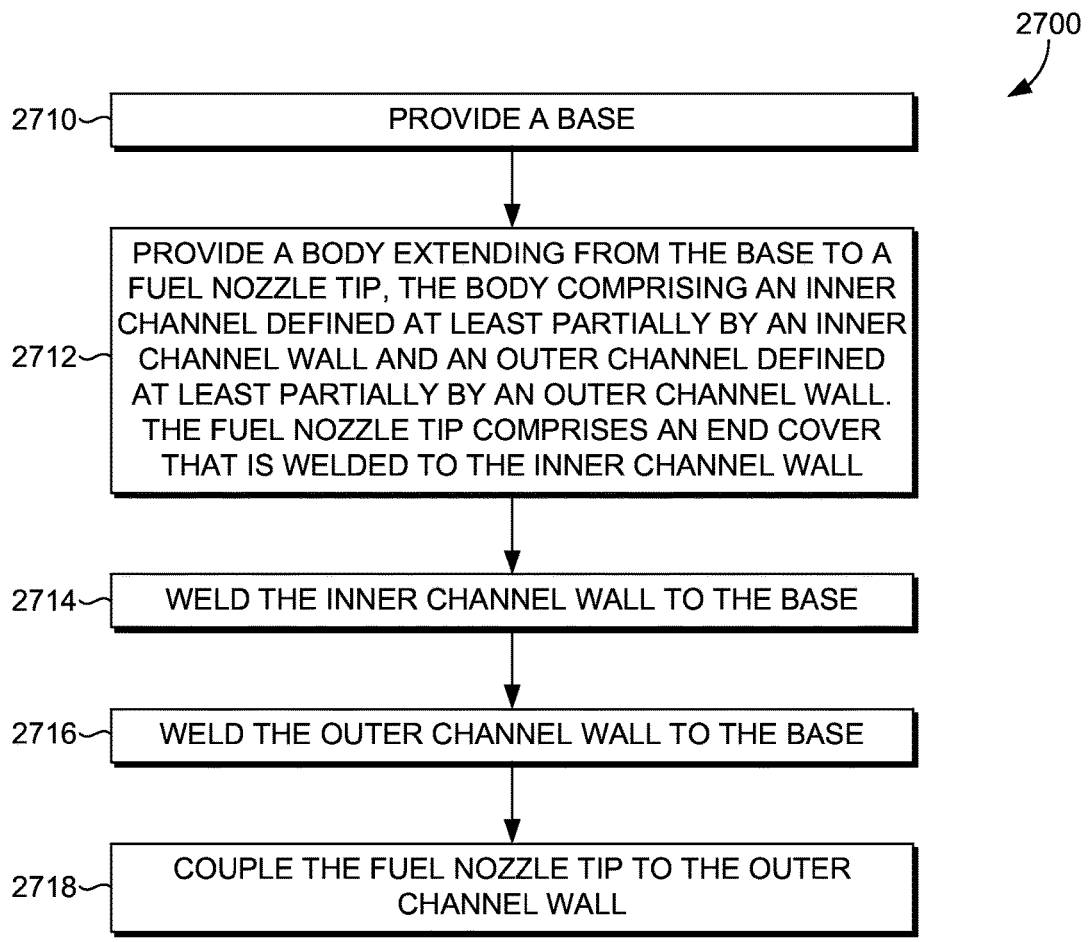
FIG. 27 is a block diagram of an exemplary method for assembling a fuel nozzle assembly, in accordance with an embodiment of the present invention.

Referring now to FIG. 27, a block diagram 2700 of a method for assembling a fuel nozzle assembly is provided, in accordance with an embodiment of the present invention. At a first block 2710, a base, such as the base 102 shown in FIG. 2, is provided. At a second block 2712, a body, such as the body 104 shown in FIG. 2, extending from the base to a fuel nozzle tip, such as the replacement fuel nozzle tip 154 shown in FIG. 2, is provided. The body comprises an inner channel, such as the inner channel 114 shown in FIG. 2, defined at least partially by an inner channel wall, such as the replacement inner channel wall 153 shown in FIG. 2, and an outer channel, such as the outer channel 118 shown in FIG. 2, defined at least partially by an outer channel wall, such as the outer channel wall 120 shown in FIG. 2. The fuel nozzle tip comprises an end cover, such as the replacement end cover 158 shown in FIG. 2, that is welded to the inner channel wall. At a third block 2714, the inner channel wall is welded to the base. At a fourth block 2716, the outer channel wall is welded to the base. At a fifth block 2718, the fuel nozzle tip is coupled to the outer channel wall.

Different fuel nozzle assemblies, or other turbine components, having different configurations may be produced, manufactured, assembled, and/or reconditioned using the methods and techniques described herein. Additionally, more or fewer components, structures, and/or elements of the fuel nozzle assemblies described herein may be utilized to produce, manufacture, assemble, and/or recondition such fuel nozzles. As a reconditioning example, only the fuel nozzle tip may be replaced, if needed, by removing a pre-installed fuel nozzle tip, fabricating and/or providing a replacement fuel nozzle tip, and coupling the replacement fuel nozzle tip to an exposed end of the fuel nozzle assembly. In this respect, at least a portion of the original components of the fuel nozzle assembly may be recycled and reused in a reconditioning process.

Different material removal and joining methods may be used to perform the aforementioned processes. Joining of fuel nozzle components such as, for example, a base end of an inner channel wall of an inner assembly to a base of a fuel nozzle assembly, joining an insert to a replacement end cover, or joining a replacement fuel nozzle tip to a body of a fuel nozzle assembly may be accomplished using a variety of joining methods. Such methods may include welding, Electron Beam ("EB") welding, laser cladding, and/or other types of welding methods.

Joining the components may be best accomplished using EB welding. EB welding is advantageous due to the limited amount of material that must be removed or sacrificed to provide a secure connection, the strength of the resulting connection, the process capability to create weld penetration within hard to access areas with limited access or line-of-sight access only, and the limited reduction of structural integrity due to the minimal loss of wall material and thickness. As such, with EB welding, a number of reconditioning processes may be performed on a single fuel nozzle assembly, as compared to traditional brazing methods, which may require a greater sacrifice of material and structural integrity with each reconditioning process, limiting the number of reconditionings that may be performed.

Furthermore, EB welding using a collection pocket may improve the processes described herein. EB welding with a collection pocket may allow shallower welding geometries, as well as less sacrifice of material during the welding/joining process. An exemplary method of EB welding may include providing a first surface to be welded, providing a second surface to be welded, forming or providing a collection pocket in at least one of the first surface and the second surface, joining the first surface to the second surface such that the collection pocket is positioned at least partially between the first surface and the second surface at a weld location, and EB welding the first surface and the second surface together at the weld location.

The collection pocket may be a bowl, depression, cavity, slot, and/or pocket which provides sufficient volume so as to be able to receive material produced from the EB welded first and second sides at the weld location. As such, when excess weld material (e.g., weld blow or spatter) is produced at the weld location, the collection pocket may at least partially retain, collect, and/or otherwise contain the excess weld material to prevent it from spilling out of the weld location. In addition to the noted advantages, EB welding does not have to be as precise as brazing and therefore may be performed more efficiently. The process described herein may be used to reduce material and effort required for reconditioning fuel nozzle assemblies, thereby improving efficiency and reducing the cost of the process.

In the material removal process, remnants of the inner assembly or the fuel nozzle tip may be present after cutting, milling, drilling, and/or otherwise removing the original, pre-installed material. Furthermore, such remnants may be further machined or otherwise removed, or may be left in place, and the fuel nozzle components provided may be machined, sized, or otherwise formed to accommodate for the space taken up by any remnants in a reconditioned assembly. The entire process of manufacturing or reconditioning a fuel nozzle assembly may be performed from the fuel nozzle tip side of the assembly, and/or from the base side. Additionally, an opening may be formed in the base to provide access to the interior of the assembly as needed, and later plugged or sealed, after the manufacturing or reconditioning process is completed.

Using the process described herein, the failure point of the fuel nozzle assembly, which is often the fuel nozzle tip or the end of the inner or outer assembly, can be fixed more often without full replacement, lengthening the operational life of the fuel nozzle assembly. This provides a longer life cycle for a single component or assembly. With each reconditioning process, the replacement fuel nozzle tip may become slightly longer, due to removal of the distal end of the pre-installed inner and/or outer assembly, and the corresponding size of the replacement fuel nozzle tip. The reconditioning process may be performed repeatedly until a threshold amount of the pre-installed inner and/or outer assembly has been removed, such that a new inner or outer assembly is required. At this point, the inner and/or outer assembly can be replaced using the same methods, potentially providing indefinite working life for the fuel nozzle assembly.

Additionally, in a new-make process where an original fuel nozzle assembly is manufactured, produced, and/or otherwise assembled or provided, there may not be any residual braze material (e.g., remnants) from a pre-existing assembly that need to be removed. The provided fuel nozzle components would be original, and would be joined, coupled, and/or welded together similar to the processes described herein. In this circumstance, the insert and the end cover may be formed or provided as one piece using either a casting method, or additive manufacturing.

Embodiments of the technology have been described herein to be illustrative rather than restrictive. Alternative embodiments will become apparent to readers of this disclosure. Further, alternative means of implementing the aforementioned elements and steps can be used without departing from the scope of the claims, as would be understood by one having ordinary skill in the art. Certain features and sub-combinations are of utility and may be employed without reference to other features and sub-combinations, and are contemplated as within the scope of the claims.

We claim:

1. A method for reconditioning fuel nozzle assemblies, the method comprising:
   providing a fuel nozzle assembly comprising:
   a base; and
   a body extending from the base to a fuel nozzle tip, the body comprising an inner channel defined at least partially by an inner channel wall and an outer channel defined at least partially by an outer channel wall, the inner channel wall and the outer channel wall each brazed to the base, wherein the fuel nozzle tip comprises an end cover that is brazed to the inner channel wall and coupled to the outer channel wall;

decoupling at least a portion of the fuel nozzle tip from the inner channel wall and the outer channel wall;

removing material from the base to provide an access opening to the inner channel through the base;

decoupling at least a portion of the inner channel wall from the base via the access opening;

removing the decoupled portion of the inner channel wall from the body;

providing a replacement inner channel wall that is welded to a replacement fuel nozzle tip;

welding the replacement inner channel wall to the base through the access opening;

sealing the access opening after welding the replacement inner channel wall to the base; and coupling the replacement fuel nozzle tip to the outer channel wall.

2. The method of claim 1, wherein the replacement fuel nozzle tip further comprises an insert and a replacement end cover that are beam welded to each other.

3. The method of claim 2, further comprising beam welding the insert to a cavity wall of the replacement end cover.

4. The method of claim 3, wherein the insert further comprises a shoulder extending from an outer surface of the insert, and wherein the shoulder is beam welded to the cavity wall of the replacement end cover.

5. The method of claim 2, further comprising beam welding a distal end of the replacement inner channel wall to the insert and beam welding a distal end of the outer channel wall to the replacement end cover.

6. The method of claim 5, wherein the distal end of the inner channel wall is offset axially from the distal end of the outer channel wall.

7. The method of claim 1, wherein removing material from the base results in a portion of the inner channel wall remaining coupled to the base after the decoupled portion of the inner channel wall is removed from the body.

* * * * *